L. PAULERO.
ELECTRICALLY OPERATED HAMMER.
APPLICATION FILED JUNE 27, 1908.
946,267.
Patented Jan. 11, 1910.
5 SHEETS—SHEET 3.
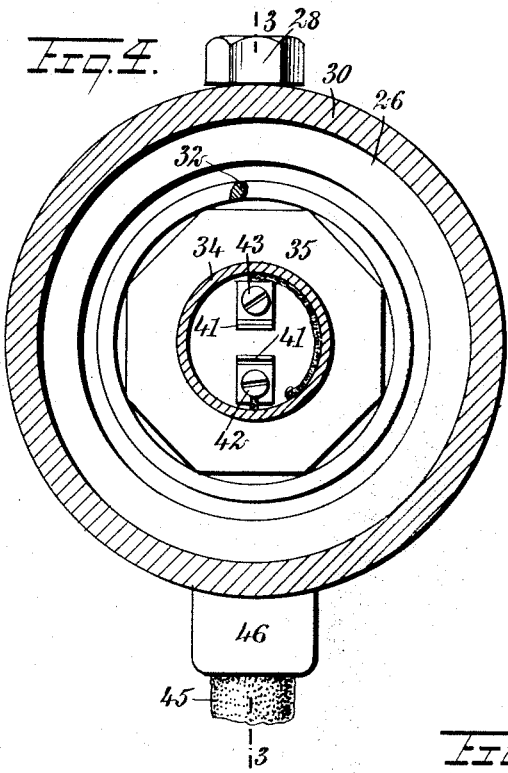
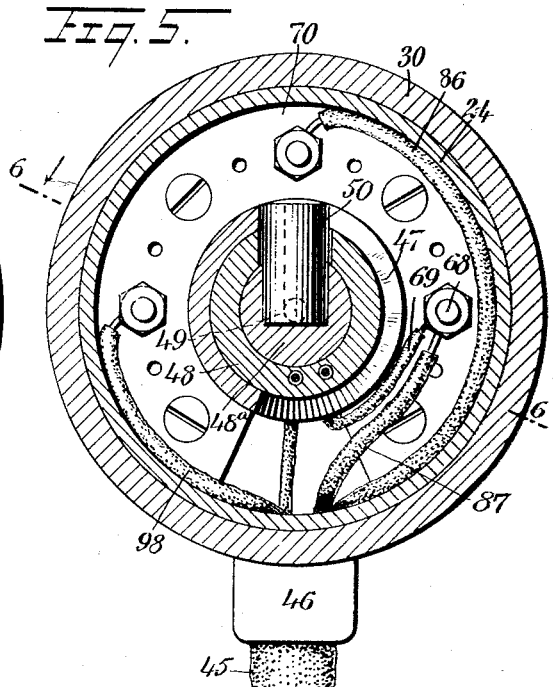
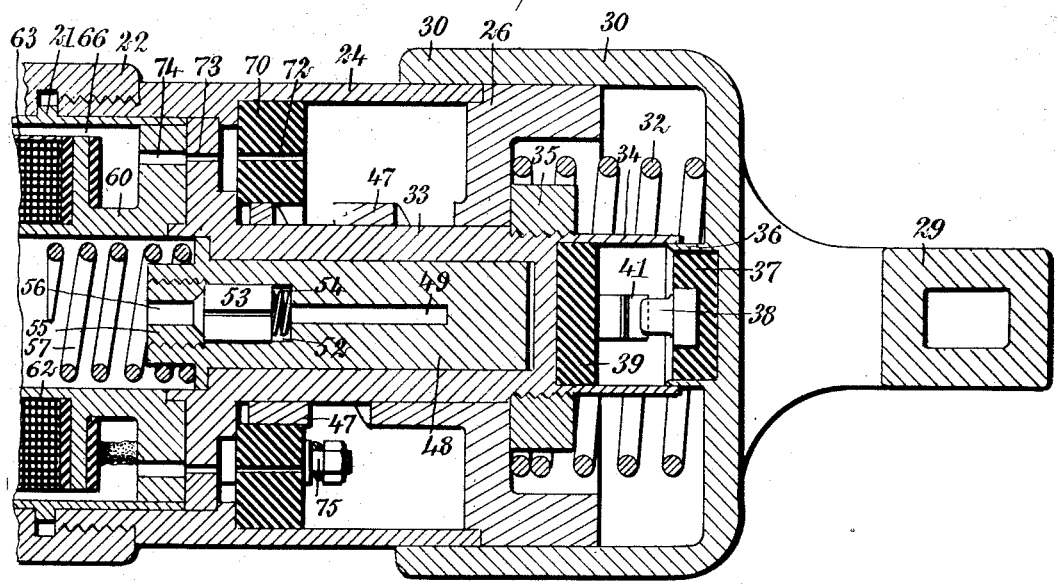
WITNESSES
H. Walker
W. Harrison
INVENTOR
Louis Paulero
BY Munn & Co.
ATTORNEYS

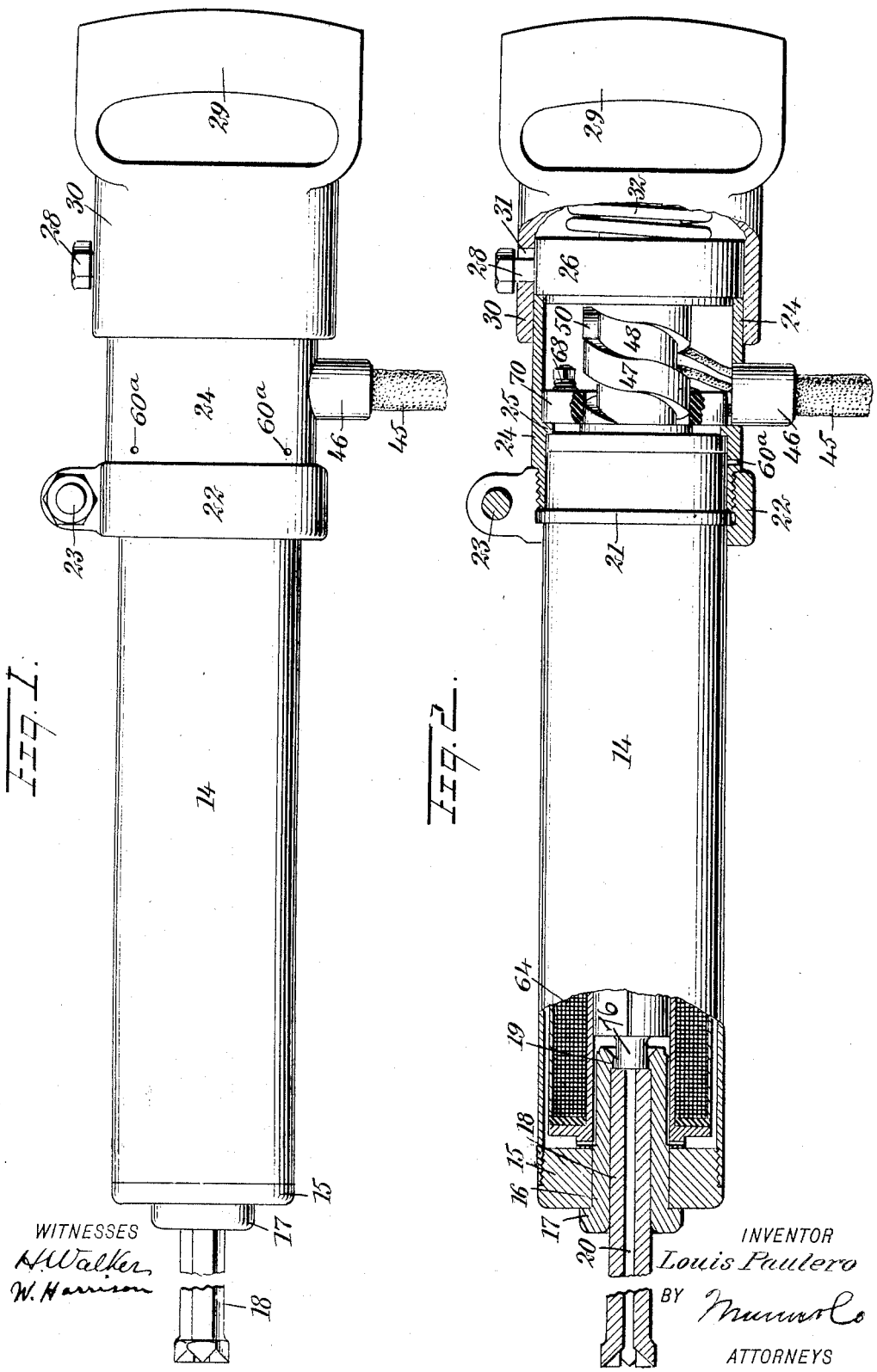

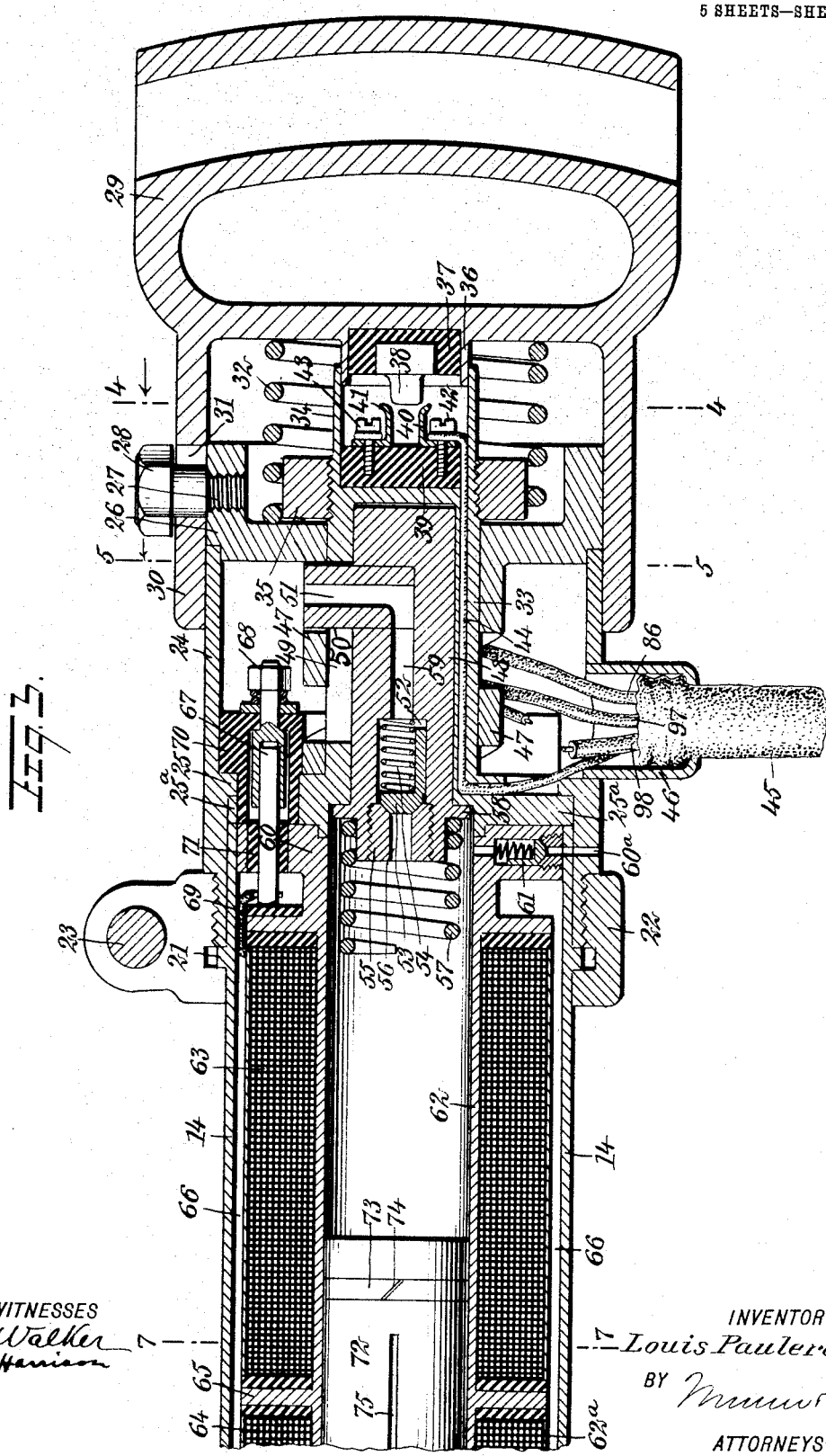

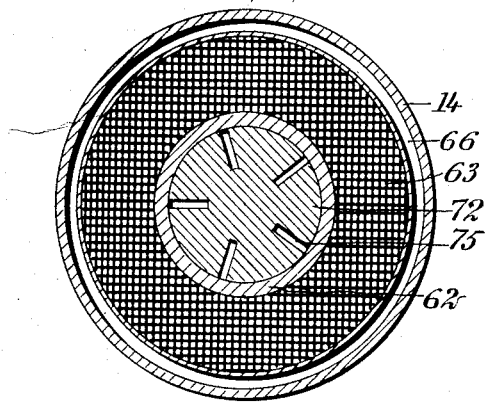
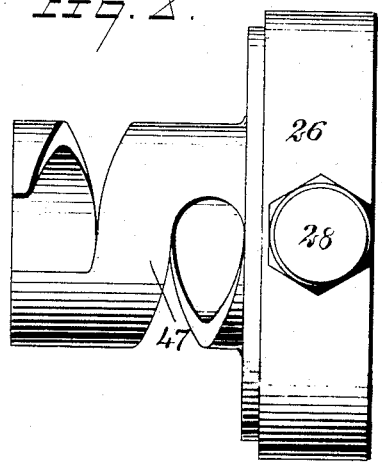
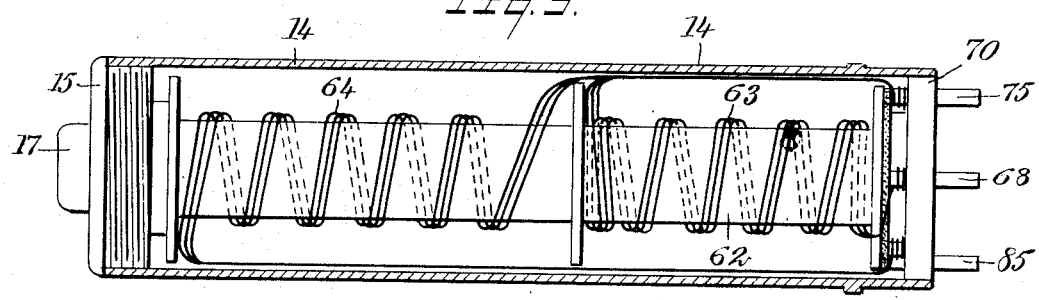
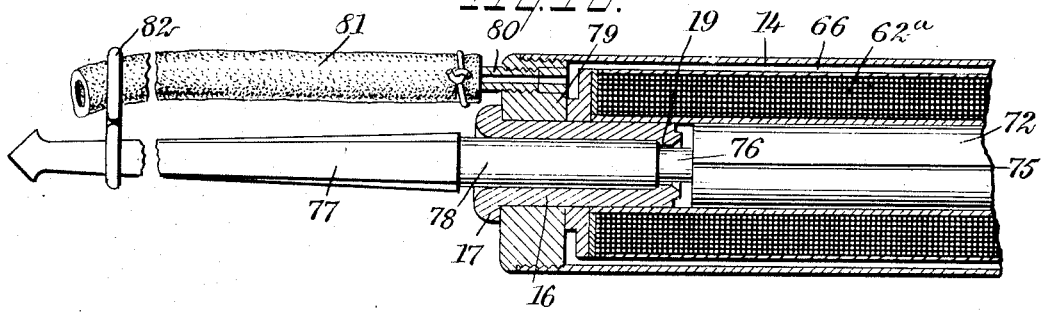

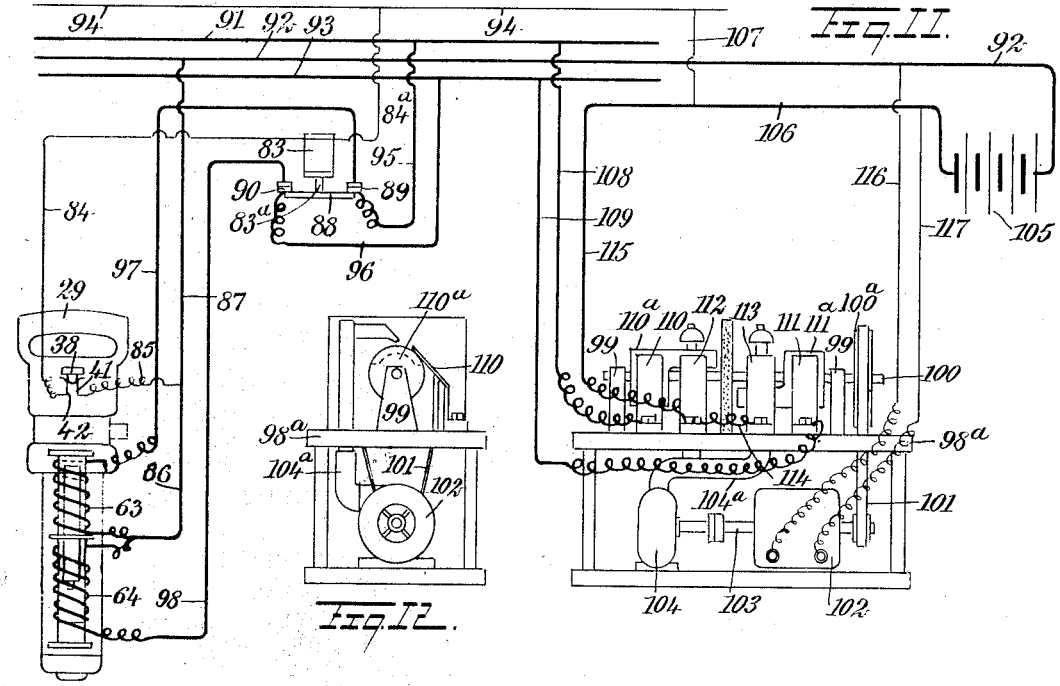
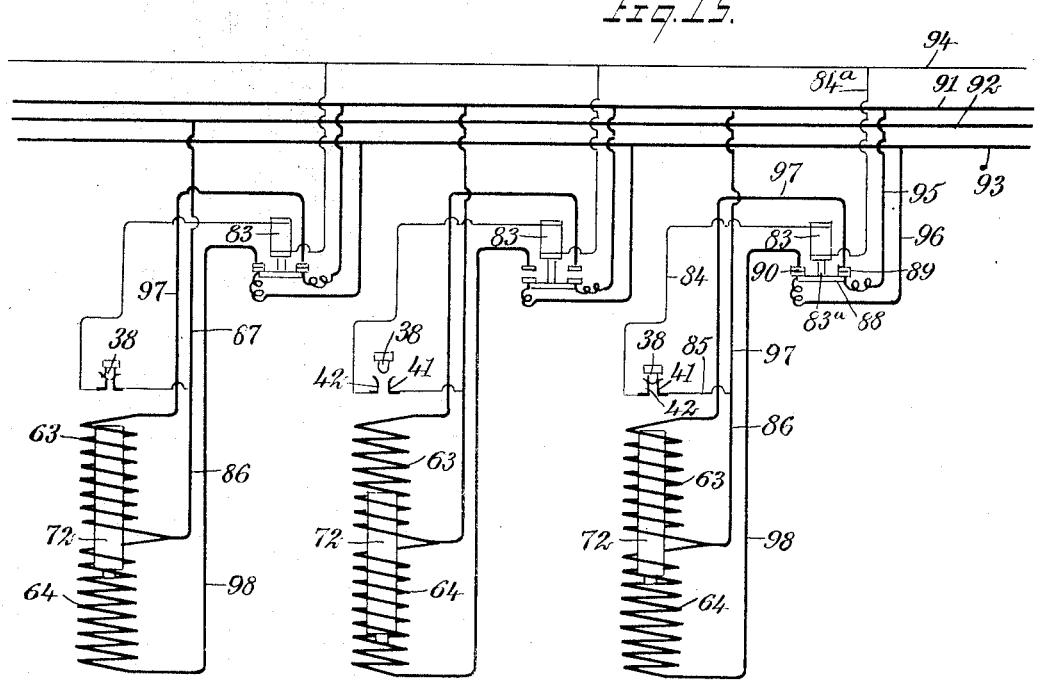

UNITED STATES PATENT OFFICE.

LOUIS PAULERO, OF PETERSBURG, VIRGINIA, ASSIGNOR TO THE VIRGINIA ELECTRIC TOOL MANUFACTURING COMPANY, OF PETERSBURG, VIRGINIA.

ELECTRICALLY-OPERATED HAMMER.

946,267.  Specification of Letters Patent.  Patented Jan. 11, 1910.

Application filed June 27, 1908. Serial No. 440,634.

*To all whom it may concern:*

Be it known that I, LOUIS PAULERO, a citizen of the United States, and a resident of Petersburg, in the county of Dinwiddie and State of Virginia, have invented a new and Improved Electrically-Operated Hammer, of which the following is a full, clear, and exact description.

My invention relates to electrically-operated hammers of the type referred to in my Patent No. 786,146, dated March 28, 1905.

My present improvements contemplate means for maintaining various parts cooled while in action under conditions wherein such parts are usually heated.

My invention further contemplates means for improving the adjustment of the stroke of the hammer.

My invention further relates to various details of construction, whereby the general efficiency of the hammer is improved.

While my invention is not limited to service in any particular branch of industry, it is especially applicable for driving rivets, and for chipping, calking, drilling and carving stone, and in mining, in fact in most relations where it is desirable to employ a motor having a reciprocating member for delivering blows.

In order to avoid excessive rises in temperature in various parts of the device, and particularly in the plunger and solenoids for actuating the same electrically, I provide for maintaining a forced draft of air through the body portion of the hammer and around the solenoid windings, the circulation of air being maintained by the reciprocating action of the plunger. In some instances I direct the expelled air in such manner as to use it for bearing away particles of dust cut or broken away by the action of the hammer upon the work. In doing this the passage made by the tool may be more easily observed by the operator, and all undesirable debris is removed as fast as formed.

In carrying out the objects above mentioned I have found it desirable to provide among other things a tool socket of special construction made of steel and hardened; a plunger of solid tool steel hardened throughout its entire length and provided with longitudinal slots; a special construction of solenoid windings for enabling them to be built compactly without impairing their efficiency; means for readily throwing the hammer into and out of action; and mechanism controllable by the operator for regulating the stroke of the hammer.

Reference is to be had to the accompanying drawings forming a part of this specification, in which similar characters of reference indicate corresponding parts in all the figures.

Figure 1 is a plan view of the hammer provided with its handle and with a tool to be struck continuously; Fig. 2 is a view somewhat similar to Fig. 1, but with the hammer partly in section; Fig. 3 is an enlarged central section upon the line 3—3 of Fig. 4, showing the valves for use in connection with air currents, and further showing the part of the contact mechanism and of the solenoids controllable thereby for actuating the plunger; this view further showing how pressure upon the handle closes the circuit and forces the hammer into action; Fig. 4 is a vertical cross section upon the line 4—4 of Fig. 3, looking in the direction of the arrow and showing a part of the contact mechanism, this view also showing the retracting spring for restoring the handle to its normal position after use; Fig. 5 is a vertical cross section substantially on the line 5—5 of Fig. 3, looking in the direction of the arrow and showing a part of the cam mechanism for controlling the length and power of the hammer strokes, this view further showing the binding posts for making electrical connections; Fig. 6 is a section upon the line 6—6 of Fig. 5, looking in the direction of the arrow and showing most of the parts appearing in Fig. 3; Fig. 7 is a section upon the line 7—7 of Fig. 3, and showing the plunger, the sleeve containing the same, the solenoid encircling this sleeve and the annular air passage encircling the solenoid for the purpose of reducing temperature; Fig. 8 is a detail plan of the spiral cam used for controlling the stroke; Fig. 9 is a longitudinal section showing the solenoids and sleeve containing the same; Fig. 10 is a fragmentary section showing how the air is ejected so as to clear away debris made by the solid point drill; Fig. 11 is a diagram showing the electrical connections from the hammer to the source of electricity, and also showing an improved form of commutator for supplying current to any number of hammers; Fig. 12 is an end elevation of the commutator; and Fig. 13 is a diagram of the electrical connections for a number of hammers operated simultaneously from the same source of electricity.

A cylindrical casing 14 is threaded internally at one of its ends and fitted with a plug 15 of annular form. Mounted within this plug and encircled by it is a sleeve 16 of hardened steel provided with an annular shoulder 17. A tool 18, which in this instance is a drill point, is provided centrally with an air passage 20 and is mounted within the sleeve 16. The casing 14 is provided with an annular bead 21, and encircling this bead is a spring band 22 clamped in position by aid of a bolt 23. A cylinder 24 is provided internally with an annular bead 25 which serves as a stop for one end of the casing 14. A disk 26 (see Fig. 3) is secured upon the cylinder 24. A bolt 28 is provided with a reduced threaded portion 27 which is screwed into the edge of the disk 26. A handle 29 is provided with a cylindrical portion 30 which fits neatly over the cylinder 24 and disk 26, and said portion 30 is provided with a slot 31 through which the bolt 28 extends. This arrangement gives the handle 29 a slight play relatively to the cylinder 24. A spiral spring 32 is mounted within the cylindrical portion 30 of the handle and presses against the disk 26.

A disk 25$^a$ is mounted within the cylinder 24 and serves to support various parts. Mounted upon this disk 25$^a$ (see lower middle portion of Fig. 3) and extending therefrom, is a sleeve 33 provided with a reduced portion 34 and fitted with a revoluble nut 35, this nut and the corresponding portion of the sleeve 34, being threaded for this purpose.

A block 37 of insulating material, retained by a wall 36, supports a wedge 38 of conducting material, preferably metal, this wedge serving as a contact member. A block 39 of insulating material is supported by the sleeve 33, and mounted upon this block are contact blades 40, 41 which mate the contact member 38 and are disposed upon opposite sides of the same. Binding posts 42, 43 are provided for the contact members 40, 41. A wire 44 is connected with the binding post 42. This wire, together with others, is provided with a covering 45, being thereby formed into a cable. The cylinder 24 is provided with a nipple 46 into which this cable extends. A spiral cam 47 (see Figs. 3 and 8) is mounted upon the disk 26 and is integral therewith.

A sleeve 48 is provided centrally with a passage 49, this passage communicating with a passage 51. A cam pin 50 is mounted rigidly upon the sleeve 48 and extends through the spiral cam 47, as will be understood from Fig. 2. The sleeve 48 is provided with a valve chamber 52 in which is mounted a valve 53 provided with a spring 54. A sleeve 55 forms a seat for this valve and is fitted into the sleeve 48. The sleeve 55 is provided with an air passage 56. A spiral spring 57 encircles the sleeve 55, and the portion of the sleeve 48 immediately adjacent thereto. This spring abuts against an annular bead 58 integral with the sleeve 48. The sleeve 48 is provided with a slot 59, serving the purpose of an air passage, in that it enables air currents to pass inside of the spiral cam 47, as will be understood from Fig. 3. The cam pin 50 is provided with an air passage 51 which communicates with the air passage 49. The cam pin 50 projects into the slot in the cam 47, which serves as a guide for it.

An annular disk 60 is mounted within the cylinder 24 and is provided with valves 61 opening inwardly, these valves having inducts 60$^a$ for admitting air (see Fig. 3). A sleeve 62, provided with an extending portion 62$^a$, and made of non-magnetic material, is encircled by a pair of solenoids 63, 64, which are separated by a partition 65 of annular form. An annular air passage 66 encircles the solenoids. A telescopic slide 67 of metal (see Fig. 3) is provided with a binding post 68 and is connected by a wire 69 with the solenoid 63. This binding post is mounted upon a sleeve 70 of insulating material. Another sleeve 71, of insulating material, but of smaller diameter than the sleeve 70, is in registry with the latter.

Mounted within the sleeve 62 (see left of Fig. 3) is a plunger 72 of hardened steel, this plunger being provided with a packing ring 73, the latter having a lap joint 74. The plunger is provided with slots 75 disposed radially for preventing the formation of eddy currents. These slots also facilitate, to some extent, the distribution of air in such manner as to maintain a lower temperature in the plunger. This plunger is provided with a striking pin 76 for the purpose of striking either a tool 18 (Fig. 2) or another tool of the type shown at 77 in Fig. 10. This last-mentioned tool is a solid drill which is provided with a reduced cylindrical portion 78, this cylindrical portion being adapted to lodge against the annular shoulder 19 of the sleeve 16. When this form of tool is used, a disk 79 (see Fig. 10) takes the place of the disk 15 shown in Fig. 2.

Mounted upon the disk 79 is a nipple 80 connected with a tube 81 of rubber or other flexible material, this tube being held by a link 82 so as to be substantially parallel with the tool 77, so that air passing through the tube last mentioned is discharged violently in the immediate neighborhood of the drill point, so as to drive away the dust and other debris as formed.

The above description covers the construction of the hammer proper. For the purpose of operating the hammer, I provide a solenoid 83 (see Figs. 11, 13) and connect this solenoid by a wire 84 with the contact member 42 inside of the hammer casing, said solenoid also connecting by a wire 84ª with the wire 94. The contact member 41 I connect by a wire 85 with wires 86, 87, the wire 86 being connected with the solenoids 63, 64. The solenoid 83 is provided with a movable armature 83ª carrying a plate 88 of nonconducting material. The solenoid is also provided with contacts 89, 90 made with large surfaces so as to carry heavy currents. These contacts are closed whenever the solenoid is energized and are opened when the solenoid is deënergized.

Wires 91, 92, 93, 94 supply current for the hammer. The wires 91, 93 are connected by wires 95, 96 with the contacts 89, 90, the contact 89 being connected by a wire 97 with the solenoid 63, and the contact 90 being connected by a wire 98 with the solenoid 64. Any number of hammers may be connected with the same system of wiring, as indicated in Fig. 13, and operated independently of each other. In order to energize the wiring, I provide a system, shown in Fig. 11.

A table 98ª is provided with standards 99 in which is journaled a shaft 100 which carries a wheel 100ª driven by a belt 101. A motor 102 is provided with an armature shaft 103 for the purpose of driving the belt 101. A blower 104 is also driven by the armature shaft, and extending upwardly from the blower is a pipe 104ª. A battery is shown at 105, and connected therewith is a wire 106. From this wire a wire 107 leads to the wire 94. Wires 108, 109 are connected with the wires 91, 93, and lead respectively to commutator brushes 110, 111. Other commutator brushes are shown at 112, 113 and are connected together by a wire 114. A wire 115 is connected with the wire 114 and also with wires 106, 107. The wires 92 and 106 are connected by wires 116, 117 with the motor 102. Commutator disks are shown at 110ª and 111ª.

The operation of my device is as follows: A number of hammers being connected up as shown in Figs. 11, 13, the action of each hammer, in so far as control of the individual operator goes, is entirely independent of the operation of other hammers. The commutator mechanism (see right of Fig. 11) I will assume to be in action. The motor is energized by a current, the circuit of which is as follows: battery 105, part of wire 92, wire 116, motor 102, wire 117, back to battery 105. The motor being in operation, the shaft 100 rotates and periodically changes the direction of flow of some of the currents. The operator, in order to use a hammer, turns the latter into a vertical position (see left of Fig. 11) and grasps the handle 29. Normally the handle is in its uppermost position. By depressing it, however, the operator forces the contact member 38 into engagement with the contact members 41, 42. This completes a circuit as follows:—battery 105, wire 92, part of wire 86, wire 85, contact members 41, 38, 42, wire 84, solenoid 83, wire 84ª, wires 94, 107, 106, back to battery 105. This causes a direct current to flow through the solenoid 83 thereby energizing the same and closing the contacts 89, 90, holding them firmly closed so long as the handle 29 is depressed. The commutator mechanism being in action as above described, the solenoids 63, 64 are each energized practically during the time the contacts 89, 90 thus remain closed. One of the circuits through the solenoid of the hammer is as follows: battery 105, wires 92, 86 to solenoids 63, 64, the current there dividing; a portion pursues the following path: solenoid 63, wire 97, contact 89, wire 95, wire 91, wire 108, commutator brush 110, commutator disks 110ª, commutator brush 112, wire 115, wire 106, back to battery 105. The other branch of the circuit from wire 86 is as follows: solenoid 64, wire 98, contact 90, wires 96, 93, 109, brush 111, disk 111ª, brush 113, wires 114, 106, to battery 105. Since the plunger 72 is of hardened steel and permanently magnetized, its polarity assists the effect of the solenoids and is of proper direction to enable the plunger to be driven downwardly. Each rotation of the commutator, however, reverses the direction of the current, and by reversing the direction of the current through the solenoids, causes the plunger to be raised. The result is that the plunger has a reciprocating movement, the frequency of which is dependent upon the number of turns of the commutator shaft. The blower 104 prevents excessive sparking as the commutator disks rotate relatively to the brushes, as may be understood from Figs. 11 and 12.

As indicated in Fig. 13, any number of hammers can be connected in the same system and operated independently of each other.

In order to adjust the strength of the blows exerted by the hammer, the handle 29 is turned upon the general axis of the hammer as a center; that is to say, the operator merely grasps the handle 29 and turns the same in a so-called "clockwise" or "contra-clockwise" direction, as the case may be. In doing this, he, of course, causes the disk 26 (see Fig. 8) and spiral cam 47 to turn, and this action forces the pin 50 (see Fig. 2) and sleeve 48 to the left, according to this figure. The sleeve 48 (see Fig. 6) moves the spring 57 to the left and thus limits the play of the plunger which is stopped upon its recoil by this spring. The sleeve 48 and parts immediately associated with it I designate as "an adjusting plunger", for the reason that they serve to adjust the stroke, and consequently the power, of the blow of the hammer.

It will be noted that the hammer above described admits of a wide range of adaptability. The plunger performs, to some extent, the office of an air pump, forcing the air continuously through the hammer. The air circuit is as follows: Entering through inlet holes 60ᵃ (see Fig. 3) the air passes through valve 61 and into the sleeve 62, while the plunger is moving to the left according to this figure. Upon the return of the plunger the air opens the valve 53, and following the passages 59, 51, goes through the passage 66 to the point of discharge. If desired, the action of the air valves 53, 61 may be reversed so that air is taken in through the upper valve instead of through the side valves, and expelled through the side valve directly into the annular cylinder. In this case, air inlet holes 60ᵃ (see Fig. 1) should be provided in the side of the upper portion of the hammer. In this case the air circuit is as follows: inlet hole 60ᵃ (see top of Fig. 1) passages 51, 59, valve 53 (reversed), into sleeve 62, this movement occurring while the piston is moving to the left, according to Fig. 3; then, upon the return of the piston the air is forced through valve 61 directly into the annular passage 66 and thence to the outlet. The action of the air in blowing out dust from the hole made by the drill is always positive, because when the plunger is raised from the tool the entire force of the upper or lifting coil is brought to bear upon the air column; consequently the air is brought to bear upon the hammer with considerable force.

The chamber in the upper or handle part of the hammer serves as an air receiver, in which the air is kept under some degree of compression by reason of the very rapid action of the reciprocating plunger.

The sleeve 16 which I designate as the tool socket, being made of hardened steel, is capable of being left very highly magnetized for a moment when the lower solenoid 64 is forced out of circuit.

When the upper coil 63 is energized, it develops in the plunger a polarity opposite to that in the tool socket, and this action enables the plunger to disengage itself from the tool at the instant the solenoid 63 is energized. The tool socket becomes very highly magnetized whenever the lower solenoid 64 is in action and attracts the plunger to the tool with greater tenacity.

I find it advisable in constructing the solenoids to build them in sections, each section representing a separate and independent solenoid, and all of the sections being connected in multiple to the main circuit. Another effective method of constructing the solenoids is to wind two or more wires side by side in the same manner as a single wire is wound, all of the wires being of the same length and resistance and connected to the main circuit in multiple. In constructing solenoids by either of the two methods just stated, I can use a plurality of wires of finer size than if a single wire were employed, and this gives them a much greater number of magnetic turns. Consequently, the solenoids are energized by a stronger field than is possible with a single length of wire in the same space. Such being the case, the construction enables me to build a smaller hammer of great power. If desired, a single wire may be used.

In the form shown in the drawings the magnetic solenoids set up fields of opposite polarity. This result may be accomplished in two ways: One is to wind the solenoids in opposite directions, the two inner ends being connected to one common return or neutral wire, and the outer ends of the solenoids being connected to the two sides of the three-wire circuit, as shown: Another way, not shown, but entirely practicable, is to wind both in the same direction, connecting an inner end to one solenoid, and the outer end of the other solenoid to the common return wire, and connecting the opposite ends of the solenoids to the two sides of the three-wire circuit. Either of the methods just stated causes current to flow through the solenoids in opposite directions, and consequently develops magnetic fields of opposite polarity. By use of the blower 104, destructive arcing is prevented in the commutator mechanism, and this enables heavy currents to be employed.

While in this specification I describe the current employed as a pulsating current, it should be understood that I do not limit myself to this arrangement, as pulsating, alternating, intermittent or direct currents may be employed, depending upon variations in the electric connections.

I call attention to the fact that the solenoid 83 provided with contacts 89, 90, being located outside of the hammer, enables the contacts 89, 90 to be made comparatively large so as to permit the use of relatively heavy currents. I also call attention to the fact that when the solenoids in the hammer are wound for a special voltage or current tension, the same hammer can be operated on a system of higher current tension, by simply inserting enough resistance between the hammer and source of current to reduce the tension or voltage to the proper value for which the solenoids are intended.

I do not limit myself to the exact construction shown and described.

Having thus described my invention, I claim as new and desire to secure by Letters Patent:

In a hammer, the combination of a casing, a solenoid mounted therein, a plunger to be actuated by said solenoid, an electric circuit connected with said solenoid for energizing the same, a handle movable relatively to said casing, a cylindrical member connected rigidly with said casing, a cylindrical member connected with said hande and extending into said cylindrical member of said casing, a contact member mounted within said cylindrical member and connected with said casing, another contact member mounted within said cylindrical member connected with said handle, said contact members being brought into engagement with each other when said handle is moved toward said casing, said contacts being included within said circuit for the purpose of controlling said solenoid.

In testimony whereof I have signed my name to this specification in the presence of two subscribing witnesses.

LOUIS PAULERO.

Witnesses:
S. S. ELLIOTT,
W. C. GILLIAM.